3,391,008
SUPPRESSION OF MOLD FORMATION ON HARD CHEESE AND HARD SAUSAGE FOODSTUFFS WITH CALCIUM SORBATE
Erich Lück, Frankfurt am Main, Germany, assignor to Farbwerke Hoechst Aktiengesellschaft vormals Meister Lucius & Bruning, Frankfurt am Main, Germany, a corporation of Germany
No Drawing. Filed Oct. 29, 1963, Ser. No. 319,668
Claims priority, application Germany, Nov. 2, 1962, F 38,200
5 Claims. (Cl. 99—162)

ABSTRACT OF THE DISCLOSURE

Method for suppressing mold formation on hard cheese and hard sausage foodstuffs by dipping in a thickened aqueous suspension of calcium sorbate and drying to form an air-permeable coating on said foodstuffs. Air impermeable films are not contemplated. Aqueous calcium sorbate suspensions thickened with cellulose ethers or cellulose esters.

---

The present invention relates to a process for treating foodstuffs to be stored for a prolonged period of time and to a composition of matter highly effective for preserving the surface of foodstuffs to be stored for a prolonged period of time against the formation and spreading out of mold fungi.

It is known to use sorbic acid and the salts thereof, preferably the alkali metal salts, for preserving foodstuffs. Moreover, it has been proposed to treat cheese with sorbic acid, for example to preserve soft cheese (cottage cheese) with sorbic acid or the alkali metal salts thereof. For preserving hard cheese, coating masses, wrapping papers and methods for treating the surface of the cheese with sorbic acid and the water-soluble salts thereof have become known, which all, however, entail disadvantages. The use of free sorbic acid is not very easy with cheese for several reasons. The most evident use, i.e., incorporation of sorbic acid or the salts thereof into the cheese curd, is difficult to carry out in practice because on separating the whey and in the further treatment of the cheese uncontrollable losses of sorbic acid occur and because by each treatment with water the sorbic acid and, to a still larger extent, the water-soluble salts thereof are partially washed off the surface of the cheese. It has likewise been proposed to dust the surface of the ripening cheese. However, in practice this method has disadvantages, too.

When the cheese is immersed in solutions of sorbates or the surface of the cheese is treated with sorbic acid, the preserving agent always penetrates into the cheese because of the water-solubility of the sorbates or the solubility in fats of sorbic acid. This is very inconvenient. In cheese making sorbic acid is generally used for inhibiting the formation and spreading of mold fungi on the surface of the cheese and, therefore, it is obvious that those quantities of sorbic acid migrating into the interior of the cheese are lost for the purposes of preservation. The migration of sorbic acid into the cheese is of no importance for those types of cheese which are consumed in a relatively fresh state, i.e., without a prolonged ripening time. It is not the same with cheese which is to be stored for months. By the migration of the preserving agent into the interior of the cheese, the content of sorbic acid on the surface of the cheese is reduced to such an extent that the formation of mold fungi becomes possible if the surface is not treated from time to time with sorbic acid.

The preservation of cheese involves greater difficulties than the preservation of other foodstuffs because some types of cheese must ripen for many months and a protection against mold fungi should be warranted for the entire storage time.

The present invention provides a process for preserving foodstuffs to be stored for a prolonged period of time which comprises dipping the said foodstuffs into an aqueous suspension of calcium sorbate and a thickening agent and subsequently drying them. The behavior of calcium sorbate is fundamentally different from that of other sorbates, because after having been applied to the surface of foodstuffs, for example the surface of cheese, it guarantees a much longer preservation from mold fungi than sorbic acid per se and the water-soluble salts thereof.

The application of calcium sorbate according to the invention is substantially different from the use of coating masses for cheese prepared from dispersions of plastics with or without the addition of preserving agents. Coating masses for cheese serve, inter alia, the purpose of promoting the ripening of the cheese, of preventing the cheese from drying and of indirectly suppressing the formation of mold fungi, i.e., by the exclusion of air. The object of the present invention is the direct preservation of the surface of foodstuffs from mold fungi by means of calcium sorbate without the admission of air being prevented as is the case with the coating masses described above.

The calcium sorbate is suitably used in the form of a suspension in an aqueous solution or suspension of a thickening agent, for example agar-agar, chondrus, tragacanth, arabic gum, pectins, starch, dextrin, glues, gelatin, casein and physiologically harmless, polymeric substances such as polyvinyl alcohol and the esters thereof, for example polyvinyl acetate. It is preferable, however, to use as thickening agents cellulose ethers or cellulose esters such as carboxymethyl cellulose and methyl cellulose. It is self-evident that only such thickening agents can be used as are physiologically harmless and are not in contradiction to food regulations.

For preserving the foodstuffs according to the present invention they are dipped into the suspension of calcium sorbate in an aqueous solution or suspension of a thickening agent and then dried.

The suspension according to the invention is not applied to the foodstuffs for the purpose of coating their surface after drying with a skin of dried thickening agent.

The thickening agent only prevents the calcium sorbate from running off too rapidly from the foodstuffs and, furthermore, fixes the individual calcium sorbate particles on the surface of the foodstuffs. The quantitative proportion of calcium sorbate to thickening agent, calculated, in each case, as weight of solid dry substance, can vary within wide limits. In general, it is 250:1 and preferably 50:1. In most cases especially good results are obtained with a quantitative proportion of 20:1 to 5:1. It is not recommended to operate with a proportion below 0.1:1.

The suspension shall contain per liter at least 10 grams of calcium sorbate. The content of thickening agent is determined by the increase in viscosity in the aqueous phase. The viscosity must be so high that the suspension only drops slowly off the surface.

The process of the invention is suitable for treating all foodstuffs which are to be stored for a prolonged period of time and on which mold fungi may develop, for example cheese, mainly hard cheese, and hard sausage.

When foodstuffs are preserved by the process of the invention the regulations of the food law and the supplements thereto must be observed.

The following examples serve to illustrate the invention, but they are not intended to limit it thereto.

EXAMPLE 1

After having been compacted in forms and salted, provolone cheese (Italian) was dipped for 10 to 15 seconds into a homogeneous suspension of the following composition, the suspension was allowed to drop off, the cheese was dried and further treated as usual.

Composition of suspension:

| | Percent |
|---|---|
| Calcium sorbate | 10.0 |
| Carboxymethyl cellulose (viscosity of a 2% aqueous solution at 20° C. about 2000 centipoises in a Höppler viscometer) | 1.5 |
| Water | 88.5 |

After the treatment the cheese was allowed to ripen for 3 months in the usual ripening rooms.

As control samples, cheese of the same production was used which had not been treated or had been treated with immersion baths in which the calcium sorbate was replaced by potassium sorbate or finely powdered sorbic acid. For each test 10 whole cheeses each having a weight of about 2 kilograms were used. The cheese was stored for a prolonged period of time.

| | Number of moldy whole cheeses after— | | | | | |
|---|---|---|---|---|---|---|
| Weeks | 1 | 3 | 5 | 8 | 10 | 12 |
| Untreated samples | 2 | 5 | 9 | 10 | 10 | 10 |
| Samples treated with sorbic acid | | | | 2 | 3 | 4 |
| Samples treated with potassium sorbate | | | | 3 | 3 | 4 |
| Samples treated with calcium sorbate | | | | | | 1 |

EXAMPLE 2

In this example, calcium sorbate is formed in an immersion bath by reacting a soluble sorbate, for example potassium or sodium sorbate with a soluble calcium salt, preferably calcium chloride.

10 parts by weight of carboxymethyl cellulose (viscosity of a 2% solution as defined in Example 1) and 57.3 parts by weight of potassium sorbate were dissolved in 800 parts by weight of water.

A solution of 21.2 parts by weight of calcium chloride (anhydrous) in 200 parts by weight of water was poured into the solution obtained.

Calcium sorbate which is sparingly soluble in water was formed. It is suitable to finely divide the suspension prior to use by passing it through a series of rollers (grinding mill).

The preserving effects obtained with this suspension substantially corresponded with those of Example 1.

I claim:

1. A process for suppressing mold formation on hard cheese and hard sausage foodstuffs which consists essentially of dipping said foodstuffs into an aqueous suspension of particulate calcium sorbate thickened with a thickening agent, the weight ratio of calcium sorbate to thickening agent therein being from 250:1 to 0.1:1, and then drying said foodstuffs to form an air-permeable coating thereover, said coating comprising particulate calcium sorbate adhered to said foodstuff by said thickening agent.

2. The process of claim 1, wherein the foodstuff is hard cheese.

3. The process of claim 1, wherein the weight ratio of solid calcium sorbate to solid thickening agent in the suspension is in the range of 20:1 to 5:1.

4. The process of claim 1, wherein the thickening agent is a member selected from the group consisting of cellulose ethers and cellulose esters.

5. A composition of matter for suppressing mold formation on hard cheese and hard sausage comprising an aqueous suspension of calcium sorbate thickened with a thickening agent selected from the group consisting of cellulose ethers and cellulose esters.

References Cited

UNITED STATES PATENTS

| | | | |
|---|---|---|---|
| 2,974,046 | 3/1961 | Perry et al. | 99—162 |
| 3,232,768 | 2/1966 | Van Wieren et al. | 99—162 |
| 3,275,454 | 9/1966 | Winterberg | 99—166 |

A. LOUIS MONACELL, *Primary Examiner.*

D. M. NAFF, *Assistant Examiner.*